US012598245B2

(12) United States Patent
Liang

(10) Patent No.: US 12,598,245 B2
(45) Date of Patent: Apr. 7, 2026

(54) HID SYSTEM AND DATA TRANSMISSION METHOD USING THE HID SYSTEM

(71) Applicant: PixArt Imaging Inc., Hsin-Chu City (TW)

(72) Inventor: Jr-Kai Liang, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 18/638,630

(22) Filed: Apr. 17, 2024

(65) Prior Publication Data

US 2025/0330533 A1      Oct. 23, 2025

(51) Int. Cl.
*H04L 69/22* (2022.01)
*H04L 69/324* (2022.01)
*G06F 3/0354* (2013.01)
*G06F 3/038* (2013.01)

(52) U.S. Cl.
CPC ............ *H04L 69/22* (2013.01); *H04L 69/324* (2013.01); *G06F 3/03543* (2013.01); *G06F 3/0383* (2013.01)

(58) Field of Classification Search
CPC ...................................................... H04L 69/22
See application file for complete search history.

(56) References Cited

U.S. PATENT DOCUMENTS

| | | | |
|---|---|---|---|
| 8,223,788 B1 * | 7/2012 | Perelstain ........... | H04L 49/9047 370/429 |
| 9,495,011 B1 * | 11/2016 | Lee ..................... | G06F 3/03547 |
| 2002/0066000 A1 * | 5/2002 | Janoska ................. | H04L 69/06 711/171 |
| 2003/0048255 A1 * | 3/2003 | Choi ..................... | G06F 3/0383 345/166 |
| 2007/0132733 A1 * | 6/2007 | Ram .................... | G06F 3/03544 345/163 |
| 2014/0210724 A1 * | 7/2014 | Chen .................... | G06F 3/0383 345/166 |
| 2019/0235648 A1 * | 8/2019 | Ligameri ............ | G06F 3/04842 |
| 2021/0286494 A1 * | 9/2021 | Perez .................. | G06F 3/03545 |
| 2021/0373678 A1 * | 12/2021 | Chauvin ............... | G06F 3/0383 |
| 2022/0006749 A1 * | 1/2022 | Momchilov ............ | H04L 69/14 |
| 2024/0019958 A1 * | 1/2024 | Su ........................ | G06F 3/04162 |
| 2024/0097824 A1 * | 3/2024 | Turner ..................... | H04L 1/08 |
| 2025/0028657 A1 * | 1/2025 | Wong .................... | G06F 13/122 |

* cited by examiner

*Primary Examiner* — Chun-Nan Lin
(74) *Attorney, Agent, or Firm* — Winston Hsu

(57) ABSTRACT

A HID system comprising a HID is disclosed. The HID comprises a data generation device, configured to generate a plurality of first data units with target data in a first mode; and a transmission device, configured to selectively use second data units or third data units to output the target data in the first mode. Second sizes of the second data units are different from third sizes of the third data units. By such system, packets with proper sizes may be selected, thus the required time of processing packets and necessary power consumption for transmitting packets may be optimized.

16 Claims, 6 Drawing Sheets

D_1 ☐☐☐☐☐☐☐☐☐☐☐☐ (12 bits)

D_2 ☐☐☐☐☐☐☐☐ (8 bits)

D_3 ☐☐☐☐☐☐☐☐☐☐☐☐ (12 bits)

Generate a plurality of first data units with target data by the data generation device in a first mode — 601

Selectively use second data units or third data units to output the target data by the transmission device in the first mode — 603

HID SYSTEM AND DATA TRANSMISSION METHOD USING THE HID SYSTEM

BACKGROUND OF THE INVENTION

1. Field of the Invention

The present invention relates to a HID (Human Interface Device) system and data transmission method, and particularly relates to a HID system and data transmission method which can select a proper data unit size for transmitting data.

2. Description of the Prior Art

A conventional HID always transmits data or other information using packets. However, the packet size is always fixed even if only a few required data is contained in the packets. Accordingly, the required time of processing packets and necessary power consumption for transmitting packets of the conventional HID could not be optimized.

SUMMARY OF THE INVENTION

One objective of the present invention is to provide a HID system which can dynamically select packets with proper sizes.

Another objective of the present invention is to provide a data transmission method which can dynamically select packets with proper sizes.

One embodiment of the present invention discloses a HID system comprising a HID. The HID comprises a data generation device, configured to generate a plurality of first data units with target data in a first mode; and a transmission device, configured to selectively use second data units or third data units to output the target data in the first mode. Second sizes of the second data units are different from third sizes of the third data units.

Another embodiment of the present invention discloses a data transmission method, applied to an HID system comprising a HID with a data generation device and a transmission device, comprising: (a) generating a plurality of first data units with target data by the data generation device in a first mode; and (b) selectively using second data units or third data units to output the target data by the transmission device in the first mode. Second sizes of the second data units are different from third sizes of the third data units.

Still another embodiment of the present invention discloses a HID system a HID. The HID comprises: a data generation device, configured to generate an analog data signal containing analog target data; and a transmission device, configured to transform the analog target data to digital target data, and configured to selectively use first digital data units or second digital data units to output the digital target data. First sizes of the first digital data units are different from the second sizes of the second digital data units.

The larger size the data units have, the longer required time of processing the data units and the larger power consumption for transmitting the data units are needed. Accordingly, by using the embodiments stated above, data units with proper sizes may be selected for transmitting the target data. By this way, the required time of processing the data units and the power consumption for transmitting the data units may be optimized.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different elements, and do not mean the sequence of the elements. For example, a first device and a second device only mean these devices may have the same structure but are different devices.

Figure 1:
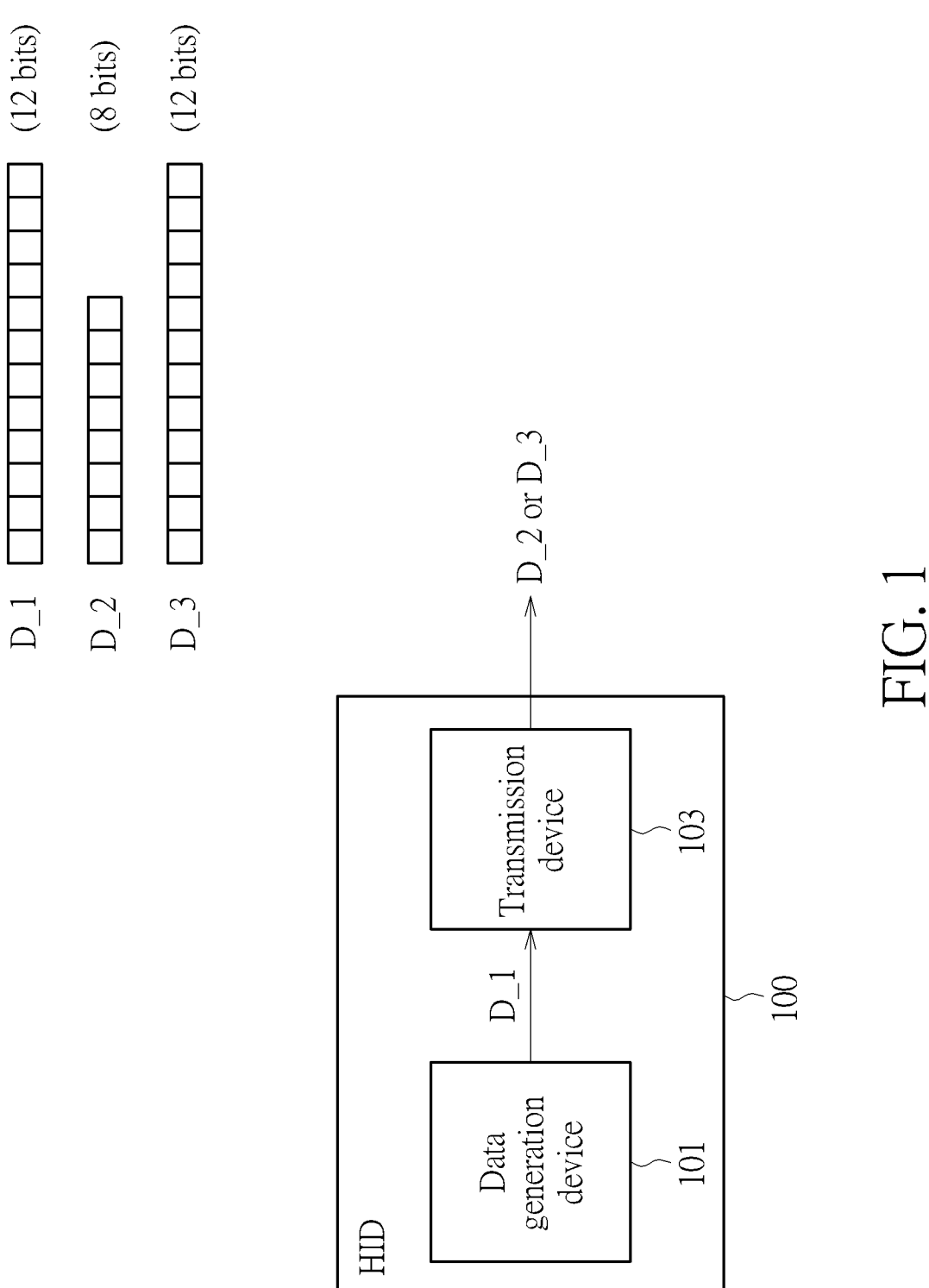
FIG. 1 is a block diagram illustrating a HID system according to one embodiment of the present invention.

FIG. 1 is a block diagram illustrating a HID system according to one embodiment of the present invention. As shown in FIG. 1, the HID system comprises a HID 100 which comprises a data generation device 101 and a transmission device 103. The data generation device 101 is configured to generate a plurality of first data units D_1 with target data in a first mode. The transmission device 103 is configured to selectively use second data units D_2 or third data units D_3 to output the target data in the first mode. Second sizes of the second data units D_2 are smaller than first sizes of the first data units D_1. Also, third sizes of the third data units D_3 are smaller than or equal to the first sizes.

As shown in FIG. 1, in one example, the first size is 12 bits, the second size is 8 bits and the third size is 12 bits. Please note, a number of the data unit sizes which the transmission device 103 can select is not limited to two. In other words, the transmission device 103 may output the target data by using data units with sizes smaller than or identical with the sizes of the data units used by the data transmission device 101. The first data units D_1, the second data units D_2 and the third data units D_3 may be packets, but may be data units using other data formats as well.

In one embodiment, the transmission device 103 selectively uses the second data units D_2 or the third data units D_3 to output the target data according to data quantities of the target data in each of the first data units D_1. For example, if the data quantities of the target data in each of the first data units D_1 is less than or equal to 8 bits, the transmission device 103 uses the second data units D_2 to output the target data. For another example, if the data quantities of the target data in each of the first data units D_1 is 11 bits, the transmission device 103 uses the third data units D_3 to output the target data. If the third data units D_3 and the first data units D_1 have the same sizes, the transmission device 103 may directly uses the first data units D_1 as the third data units D_3.

In one embodiment, the HID comprises a sensor, and the target data is sensed information generated by the sensor. For example, the data generation device 101 is a location data generation device, and the sensed information is location data which means relative displacement between the HID and an object (e.g., a pen, a finger, a sensing surface, a desk surface, or a ground). In such case, the HID 100 may be an optical navigation device and the data generation device 101 is an optical sensor.

Figure 2:
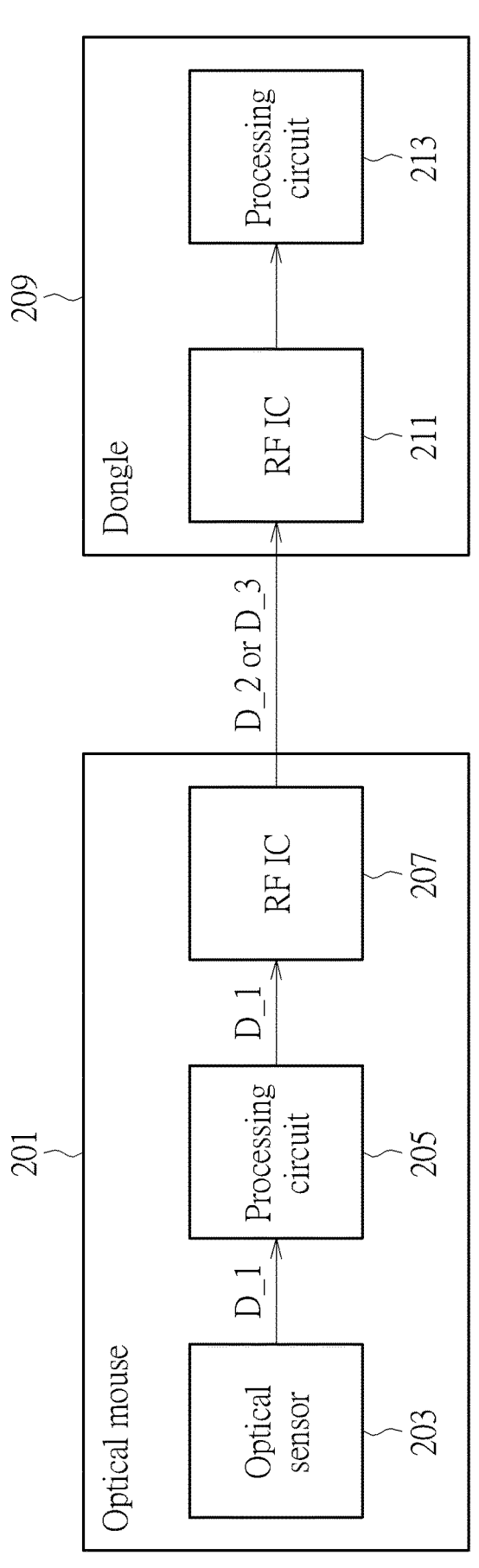
FIG. 2 is a block diagram illustrating an optical mouse according to one embodiment of the present invention.

In one embodiment, the HID 100 is an optical mouse. FIG. 2 is a block diagram illustrating an optical mouse according to one embodiment of the present invention. In the embodiment of FIG. 2, the HID 100 is an optical mouse 201 which comprises an optical sensor 203, a processing unit 205 and an RF IC (Radio Frequency Integrated Circuit) 207. The processing unit 205 may be implemented by a hard ware processing circuit. Also, the processing unit 205 may be implemented by at least one processing program which is executed by software, firmware or hardware.

In such case, the data generation device 101 is the optical sensor 203, and the transmission device 103 is the RF IC 207. The optical sensor 203 is configured to sense optical data (e.g., images) and generates the location data according to the optical data. Then, the optical sensor 203 outputs the location data by using the first data units D_1 to the processing unit 205. In one embodiment, the location data may comprise X coordinates and Y coordinates. After that, the processing unit 205 controls the RF IC 207 to selectively use the second data units D_2 or the third data units D_3. Please note, in FIG. 2, the processing unit 205 receives the first data units D_1 and transfers the first data units D_1 to the RF IC 207. However, in another embodiment, the optical sensor 203 respectively transmits the first data units D_1 to the processing unit 205 and the RF IC 207.

In one embodiment, the RF IC 207 may selectively use the second data units D_2 or the third data units D_3 to output the target data according to the parameters used by the optical mouse 201. For example, in one embodiment, the RF IC 207 selectively uses the second data units D_2 or the third data units D_3 to output the target data according to an IPS (Inches Per Second) of the optical mouse 201. In another embodiment, the RF IC 207 selectively uses the second data units D_2 or the third data units D_3 to output the target data according to a CPI (Count Per Inch) of the optical mouse 201. In one embodiment, the IPS and the CPI have a positive correlation with the location data which is to be output by the optical mouse 201. Accordingly, if the IPS or the CPI is high, the data unit which has a large size is used. On the opposite, if the IPS or the CPI is low, the data unit which has a small size is used.

In one embodiment, the RF IC 207 outputs the second data units D_2 or the third data units D_3 to a dongle 209, which respectively comprises a RF IC 211 and a processing unit 213. The dongle 209 may be used for wireless communication between the optical mouse 201 and a computer. For example, the dongle 209 is inserted and connected to the computer, receives the location data provided by the optical sensor 203 and transmits the location data to the computer. Afterwards, the computer moves a cursor displayed on a screen according to the location data.

In the embodiments of FIG. 1 and FIG. 2, the data generation device 101 uses the first data units D_1 in the first mode, and the transmission device 103 uses the second data units D_2 or the third data units D_3 in the first mode. However, the data generation device 101 and the transmission device 103 may use the data units with other sizes in another mode.

Figure 3:
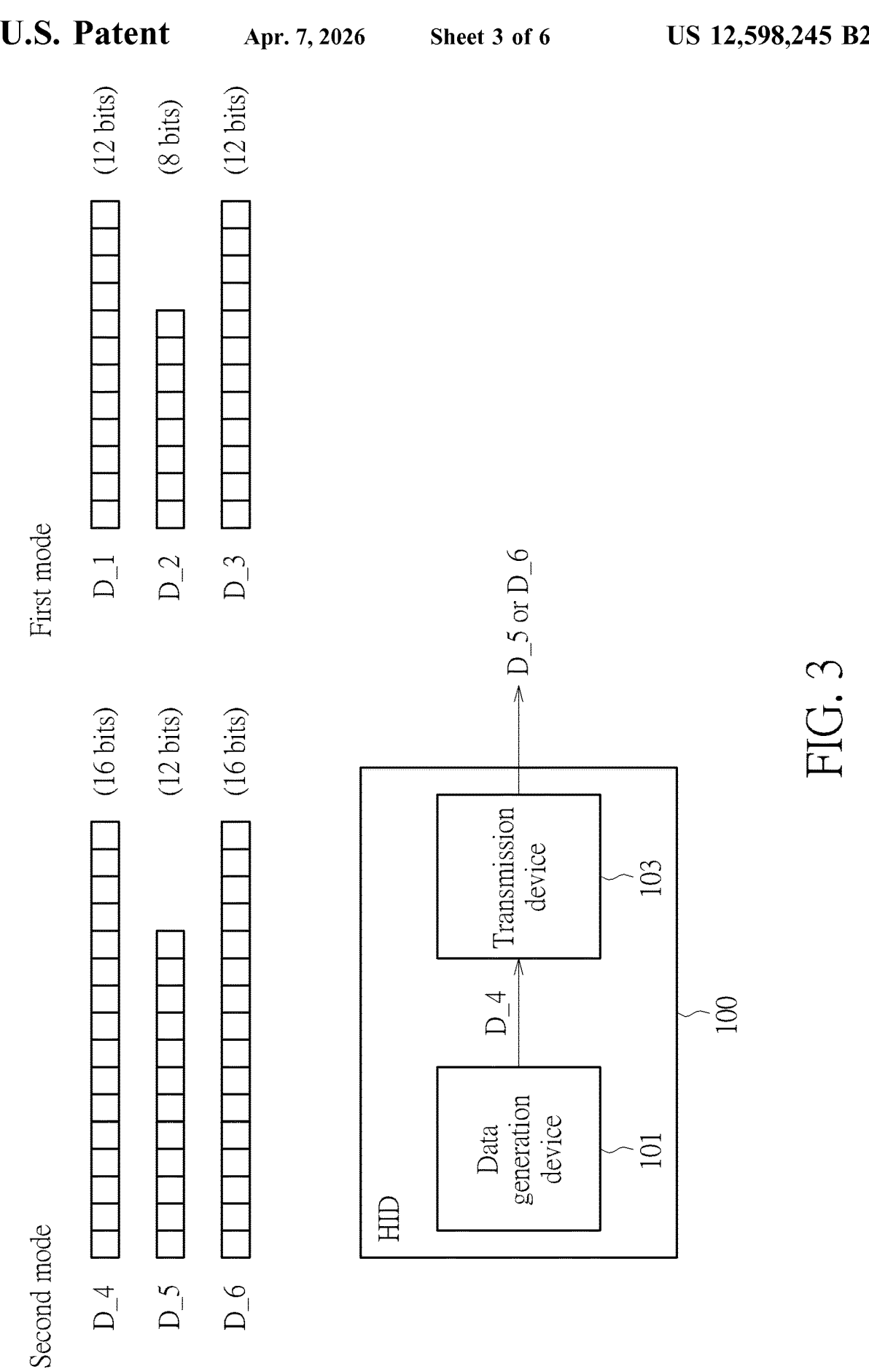
FIG. 3 is a block diagram illustrating a HID system according to another embodiment of the present invention.

FIG. 3 is a block diagram illustrating a HID system according to another embodiment of the present invention. In the embodiment of FIG. 3, if the data generation device 101 and the transmission device 103 operate in the first mode, the operations thereof are the same as the operations stated in FIG. 1, thus related descriptions are omitted for brevity here.

Besides, in the embodiment of FIG. 3, the data generation device 101 is configured to generate a plurality of fourth data units D_4 with target data in a second mode. The transmission device 103 is configured to selectively use fifth data units D_5 or sixth data units D_6 to output the target data in the second mode. Fourth sizes of the fourth data units D_4 are larger than the first sizes of the first data units D_1. Fifth sizes of the fifth data units D_5 are smaller than the fourth sizes. Sixth sizes of the sixth data units D_6 are smaller than or equal to the fourth sizes. Please note, a number of the data unit sizes which the transmission device 103 can select is not limited to two. In other words, the transmission device 103 may output the target data by using data units with sizes smaller than or identical with the sizes of the data units used by the data transmission device 101. As shown in FIG. 3, in one embodiment, the fourth size is 16 bits, the fifth size is 12 bits and the sixth size is 16 bits. If the sixth data units D_6 and the fourth data units D_4 have the same sizes, the transmission device 103 may directly uses the fourth data units D_4 as the sixth data units D_6. The fourth data units D_4, the fifth data units D_5 and the sixth data units D_6 may be packets, but may be data units using other data formats as well.

Figure 4:
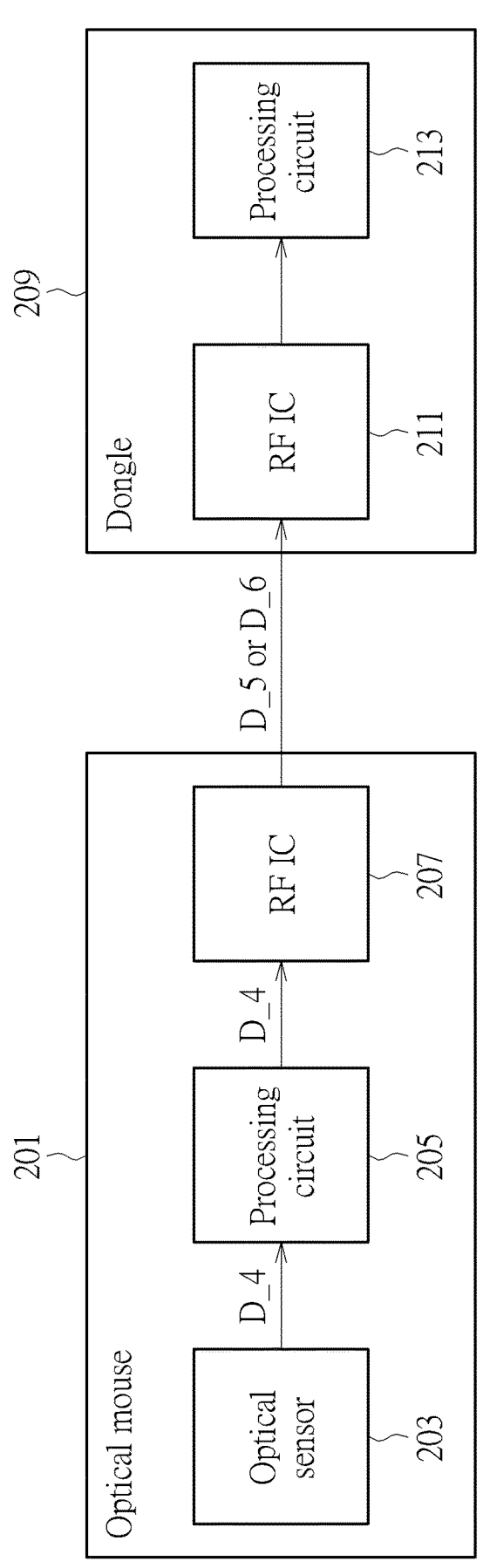
FIG. 4 is a block diagram illustrating an optical mouse according to another embodiment of the present invention.

The embodiment illustrated in FIG. 3 may also be applied to an optical mouse. In such example, the first mode may be an office mode in which the optical mouse is moved less often and slowly. Also, the second mode may be a gaming mode in which the optical mouse is moved often and quickly. FIG. 4 is a block diagram illustrating an optical mouse according to another embodiment of the present invention. In the embodiment of FIG. 4, the optical mouse 201 comprises an optical sensor 203, a processing unit 205 and an RF IC 207. The optical sensor 203 is configured to sense optical data and generates the location data according to the optical data.

If the processing unit 205 and the RF IC 207 operate in the first mode, the operations thereof are the same as the operations stated in FIG. 2, thus related descriptions are omitted for brevity here. In the second mode, the optical sensor 203 outputs the location data using the fourth data units D_4 to the processing unit 205. After that, the processing unit 205 controls the RF IC 207 to selectively use the fifth data units D_5 or the sixth data units D_6. Please note, in FIG. 4, the processing unit 205 receives the fourth data units D_4 and transfers the fourth data units D_4 to the RF IC 207. However, in another embodiment, the optical sensor 203 respectively transmits the fourth data units D_4 to the processing unit 205 and the RF IC 207.

In the second mode, the RF IC 207 may selectively use the fifth data units D_5 or the sixth data units D_6 to output the target data according to the parameters used by the optical mouse 201. For example, in one embodiment, the RF IC 207 selectively use the fifth data units D_5 or the sixth data units D_6 to output the target data according to an IPS of the optical mouse 201. In another embodiment, the RF IC 207 selectively uses the selectively use the fifth data units D_5 or the sixth data units D_6 to output the target data according to a CPI of the optical mouse 201. In one embodiment, the IPS and the CPI have a positive correlation with the location data which is to be output by the optical mouse 201. Accordingly, if the IPS or the CPI is high, the data unit which has a large size is used. On the opposite, if the IPS or the CPI is low, the data unit which has a small size is used.

In one embodiment, the RF IC 207 outputs the fifth data units D_5 or the sixth data units D_6 to a dongle 209, which respectively comprises a RF IC 211 and a processing unit 213. The dongle 209 may be used for wireless communication between the optical mouse 201 and a computer. For example, the dongle 209 is inserted and connected to the computer, receives the location data provided by the optical sensor 203 and transmits the location data to the computer. Afterwards, the computer moves a cursor displayed on a screen according to the location data.

In abovementioned embodiments, the second sizes of the second data units D_2 and third sizes of the third data units D_3 are smaller than or equal with the first sizes of the first data units D_1. However, in one embodiment, the second sizes or the third sizes may be larger than the first sizes, corresponding to some requirements such as encryption or noise reduction.

Further, in one embodiment, the second sizes and the third sizes are different due to the different accuracies thereof. For example, if the second data units D_2 and the third data units D_3 are used for distance measurements, the accuracies of the second data units D_2 are centimeters and the accuracies of the third data units D_3 are millimeters. For another example, if the second data units D_2 and the third data units D_3 are used for counters, the accuracies of the second data units D_2 are tens digits of counting values and the units of the third data units D_3 are digits of counting values. The rules of the second data units D_2 and the third data units D_3 mentioned here may also be applied to fifth data units D_5, sixth data units D_6 mentioned in FIG. 3 and FIG. 4.

In above-mentioned embodiments, the data received by the transmission device 103 (i.e., the first data units D_1) is in a digital format. In these embodiments, if the first data units D_1 are transformed from an analog signal, the device for transforming the analog signal to a digital format (e.g., an ADC) may be located outside the transmission device 103. However, in another embodiment, the data received by the transmission device may be in an analog format. In such embodiment, the device for transforming the analog signal to the digital format may be located inside or be integrated to the transmission device.

Figure 5:
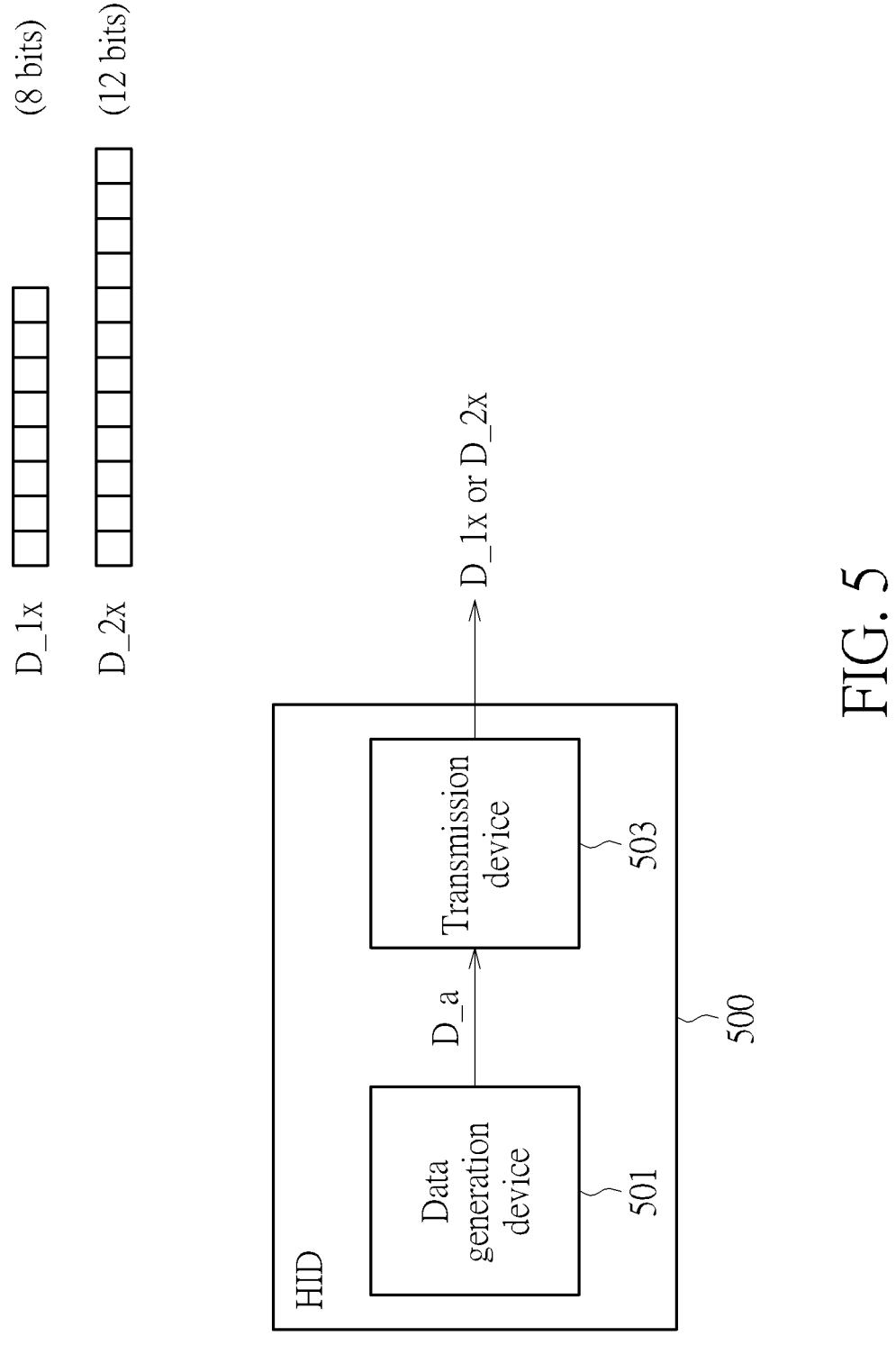
FIG. 5 is a block diagram illustrating a HID system according to still another embodiment of the present invention.

FIG. 5 is a block diagram illustrating a HID system according to still another embodiment of the present invention. As shown in FIG. 5, the HID system comprises a HID 500 which comprises a data generation device 501 and a transmission device 503. The data generation device 501 is configured to generate an analog data signal D_a containing analog target data. The transmission device 103 is configured to transform the analog target data to the digital target data, and selectively use first digital data units D_1x or second digital data units D_2x to output digital target data. First sizes of the first digital data units D_1x and second sizes of the second digital data units D_2x are different. In one embodiment, the first size is 8 bits and the second size is 12 bits, but not limited. The selection of the first digital data units D_1x and the second digital data units D_2x may follow the above-mentioned rules, thus descriptions thereof are omitted for brevity here.

Figure 6:
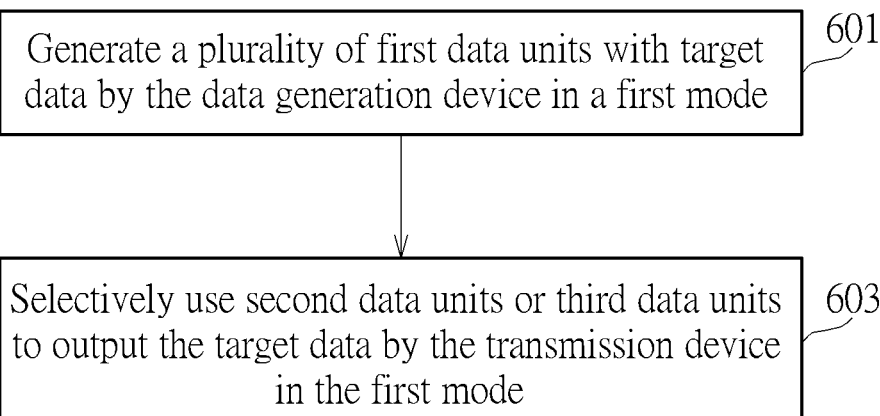
FIG. 6 is a flow chart illustrating a data transmission method according to one embodiment of the present invention.

In view of above-mentioned embodiments, a data transmission method corresponding to FIG. 1-FIG. 4 may be acquired, which is applied to a HID system comprising a HID (e.g., the HID 100 in FIG. 1) with a data generation device and a transmission device. FIG. 6 is a flow chart illustrating a data transmission method according to one embodiment of the present invention, which comprises following steps:

Step 601

Generate a plurality of first data units (e.g., the first data units D_1 in FIG. 1) with target data by the data generation device in a first mode.

Step 603

Selectively use second data units (e.g., the second data units D_2 in FIG. 2) or third data units (e.g., the third data units D_3 in FIG. 2) to output the target data by the transmission device in the first mode.

Second sizes of the second data units are different from the third sizes of the third data units. In one embodiment, second sizes are smaller than first sizes of the first data units. Third sizes are smaller than or equal to the first sizes.

In one embodiment, the data transmission method further comprises following steps:

generating a plurality of fourth data units (e.g., the fourth data units D_4 in FIG. 3) with the target data by the data generation device in a second mode; selectively using fifth data units (e.g., the fifth data units D_5 in FIG. 3) or sixth data units (e.g., the sixth data units D_6 in FIG. 3) to output the target data by the transmission device in the second mode.

Fourth sizes of the fourth data units are larger than the first sizes; wherein fifth sizes of the fifth data units are smaller than the fourth sizes. Also, sixth sizes of the sixth data units are smaller than or equal to the fourth sizes.

The larger size the data units have, the longer required time of processing the data units and the larger power consumption for transmitting the data units are needed. Accordingly, by using the embodiments stated above, data units with proper sizes may be selected for transmitting the target data. By this way, the required time of processing the data units and the power consumption for transmitting the data units may be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A HID (Human Interface Device) system, comprising:
a HID, comprising:
a data generation circuit, configured to generate a plurality of first packets with target data in a first mode; and
a transmission circuit configured to selectively use second packets or third packets to output the target data in the first mode, according to data quantities of the target data or according to a parameter used by the HID;
wherein second sizes of the second packets are different from the third sizes of the third packets;
wherein the second sizes are smaller than the first sizes;
wherein the third sizes are smaller than or equal to the first sizes.

2. The HID system of claim 1, wherein the HID comprises a sensor, and the target data is sensed information generated by the sensor.

3. The HID system of claim 2, wherein the data generation circuit is a location data generation circuit, and the sensed information is location data which means relative displacement between the HID and an object.

4. The HID system of claim 3, wherein the HID is an optical navigation device and the data generation circuit is an optical sensor.

5. The HID system of claim 4, wherein the HID is an optical mouse, wherein the parameter is an IPS (Inches Per Second) or a CPI (Count Per Inch) of the optical mouse.

6. The HID system of claim 2, wherein the transmission circuit outputs the second packets or the third packets to a dongle.

7. The HID system of claim 1, wherein the data generation circuit is further configured to generate a plurality of fourth packets with the target data in a second mode;

wherein the transmission circuit selectively uses fifth packets or sixth packets to output the target data in the second mode;

wherein fourth sizes of the fourth packets are larger than the first sizes;

wherein fifth sizes of the fifth packets are different from the sixth sizes of the sixth packets.

8. A data transmission method, applied to an HID (Human Interface Device) system comprising a HID with a data generation circuit and a transmission circuit, comprising:

(a) generating a plurality of first packets with target data by the data generation circuit in a first mode; and (b) selectively using second packets or third packets to output the target data by the transmission circuit in the first mode, according to data quantities of the target data or according to a parameter used by the HID;

wherein second sizes of the second packets are different from third sizes of the third packets;

wherein the second sizes are smaller than the first sizes;
wherein the third sizes are smaller than or equal to the first sizes.

9. The data transmission method of claim 8, wherein the HID comprises a sensor, and the target data is sensed information generated by the sensor.

10. The data transmission method of claim 9, wherein the data generation circuit is a location data generation circuit, and the sensed information is location data which means relative displacement between the HID and an object.

11. The data transmission method of claim 10, wherein the HID is an optical navigation device and the data generation circuit is an optical sensor.

12. The data transmission method of claim 11, wherein the HID is an optical mouse, wherein the parameter is an IPS (Inches Per Second) of the optical mouse.

13. The data transmission method of claim 11, wherein the HID is an optical mouse, wherein the step (b) selectively uses the second packets or the third packets to output the target data according to a CPI (Count Per Inch) of the optical mouse.

14. The data transmission method of claim 11, wherein the transmission circuit outputs the second packets or the third packets to a dongle.

15. The data transmission method of claim 8, further comprising:

generating a plurality of fourth packets with the target data by the data generation circuit in a second mode;

selectively using fifth packets or sixth packets to output the target data by the transmission circuit in the second mode;

wherein fourth sizes of the fourth packets are larger than the first sizes;

wherein fifth sizes of the fifth packets are smaller than the fourth sizes;

wherein sixth sizes of the sixth packets are smaller than or equal to the fourth sizes.

16. A HID (Human Interface Device) system, comprising:

a HID, comprising:

a data generation circuit, configured to generate an analog data signal containing analog target data; and a transmission devicecircuit, configured to transform the analog target data to digital target data, and configured to selectively use first digital packets or second digital packets to output the digital target data;

wherein first sizes of the first digital packets are different from the second sizes of the second digital packets.

* * * * *